Patented Aug. 14, 1923.

1,464,580

UNITED STATES PATENT OFFICE.

HENRI JÉAN FRANÇOIS PHILIPON, OF BELLEGARDE-EN-FOREZ, FRANCE.

HEAT REGENERATOR.

No Drawing.  Application filed June 1, 1921. Serial No. 474,250.

*To all whom it may concern:*

Be it known that I, HENRI JÉAN FRANÇOIS PHILIPON, a citizen of the French Republic, residing at Bellegarde-en-Forez, Department of Loire, France, have invented new and useful Improvements in Heat Regenerators, of which the following is a specification.

This invention relates to improvements in heat recuperative apparatus or regenerators. Large economies of fuel have already been effected in furnaces by applying methods of recuperation. As is well known, recuperation consists in waste or burnt gases to circulate around pipes or the like which bring in the opposite direction the fuel or air for combustion. In these conditions, the gases give up a part of its heat which is thus returned to the furnace. Until the present time there have been employed for recuperative purpose, either metallic tubes or tubes of refractory aluminous material.

In metal pipings, the exchange of heat easily takes place but these pipes oxidize or melt so that their use is greatly limited. This explains, for instance, the replacing of recuperators with cast metal or iron tubes (Whitwell type) by regenerators (of the Cowper type).

Present day recuperators are generally made of stone or pottery ware or aluminous earth. Such pottery ware possesses serious inconveniences because it is generally too thick (5 mm. thickness at least); exchange of heat thus takes place badly through the walls. Moreover it is not serviceable in furnaces where the gases pass out at a high temperature because of the low fusing point of such pottery ware and also because refractory aluminous materials lose their shape at high temperature.

According to the present invention tubes of fused quartz are employed in the construction of heat recuperative apparatus; in this way recuperators can be constructed having a very high efficiency because tubes can be obtained of fused quartz having very thin walls (2 millimetres for instance) which are easily permeated or passed through by heat. Moreover, since fused quartz is very refractory, it can be employed in furnaces giving the highest known temperatures; by reason of its low expansion it does not present the inconveniences of tubes of iron or cast metal and can be subjected, without danger, to abrupt variations of temperature. Lastly fused quartz being unalterable at high temperature, apparatus provided with these quartz tubes require hardly any maintenance or upkeep.

Having now particularly described and ascertained the nature of my said invention and in what manner the same is to be performed, I declare that what I claim is:

1. A heat recuperative apparatus for furnaces and the like comprising fused quartz tubular elements, through which takes place the exchange of heat.

2. A heat recuperative apparatus for furnaces and the like comprising fused quartz, tubular elements with very thin walls, said walls permitting free heat exchange to take place therethrough.

In testimony whereof I have signed my name to this specification.

HENRI JÉAN FRANÇOIS PHILIPON. [L. S.]

Witnesses:
ETIENNE DESGEORGES,
SALOMON AVIGDOR.